Figure 1:
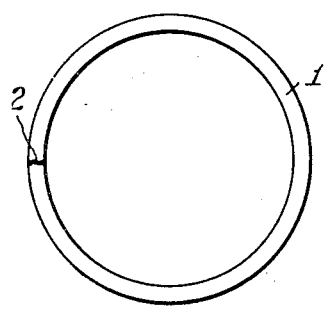

May 13, 1930.  A. J. SMITH  1,758,719
PROCESS OF MAKING PISTON RINGS
Filed June 12, 1924   3 Sheets-Sheet 1

Inventor
A. J. Smith,
by Wallace R. Lane.
Atty.

May 13, 1930.                    A. J. SMITH                    1,758,719
                        PROCESS OF MAKING PISTON RINGS
                    Filed June 12, 1924        3 Sheets-Sheet 2
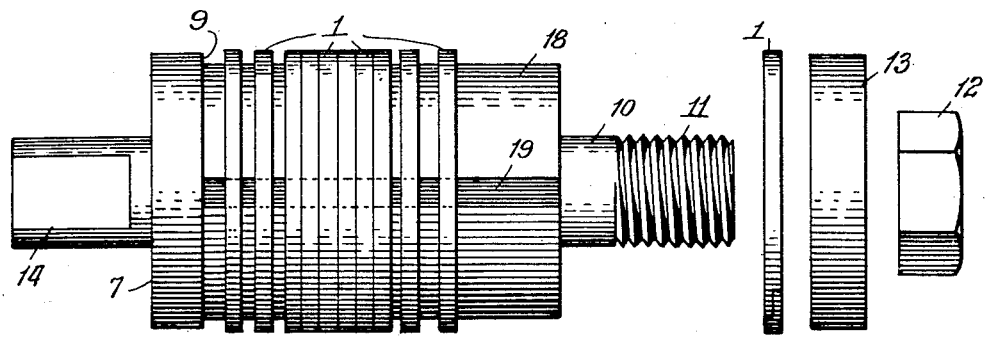
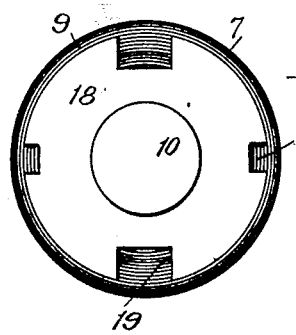
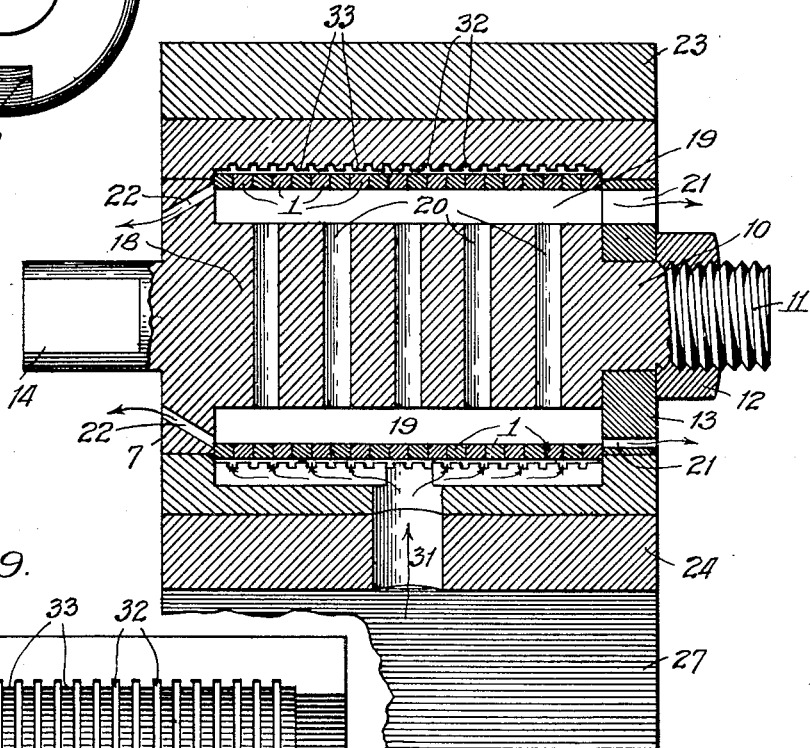
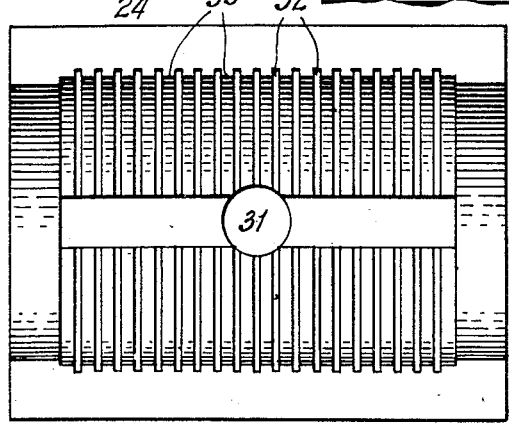
Inventor
A. J. Smith,
by Wallace R. Lane.
Atty.

May 13, 1930.  A. J. SMITH  1,758,719

PROCESS OF MAKING PISTON RINGS

Filed June 12, 1924  3 Sheets-Sheet 3

Inventor
A. J. Smith,
by Wallace R. Lane.
Atty.

Patented May 13, 1930

1,758,719

UNITED STATES PATENT OFFICE

ALBA JOHN SMITH, OF CHICAGO, ILLINOIS, ASSIGNOR TO GILL MANUFACTURING COMPANY, OF CHICAGO, ILLINOIS, A CORPORATION OF ILLINOIS

PROCESS OF MAKING PISTON RINGS

Application filed June 12, 1924. Serial No. 719,649.

The present invention relates to the manufacture of piston rings and like and similar articles and objects, and more particularly to the method and apparatus for producing the same.

Piston rings, particularly those in use in internal combustion motors and like and similar engines, are generally cast and have more or less rough interior and exterior surfaces.
When cut and ground or otherwise machined they also are generally, what is known in piston ring manufacturing parlance, "thick or thin," or, in other words, are heavier or thicker at one or more points than at others.
These variations from the desired uniformity of thickness, concentricity and circularity, arise, usually, from unevenness in the molding caused by the "rapping" of the molding machine, or to the improper centering of the rings on the mandrel, or the cutting away of more or less material from a joint than at others.

Among the objects of my invention are to eliminate such variations, particularly the "thick and thin" characteristics; to reduce the number of operations heretofore necessary in the production of piston rings; to reduce the cost of producing the same; to provide for a novel method or process wherein the joints of the rings will be closed when the rings are of the same internal diameter, as when placed on a mandrel, or, expressed in other words, when the rings all have the same internal diameter, when held upon a mandrel or arbor, will have their joints closed; to provide for casting the rings without joints; to provide for breaking the rings at given points where the points are to occur; to provide the joints at the given points and all of equal widths.
though more or less material may be needed to be removed where the rings may be respectively more or less thin; to hold the rings to a given internal diameter when making the joints; to apply the rings to a support or templet of given exterior size, preferably a trifle larger in diameter than the normal internal diameter of the rings for giving the rings, when broken at the given points thereof, a given internal increased diameter at which time the joints may be preferably cut; to provide a novel templet to arrive at this object; to provide such templet with means, such as a channel or recess for clearing the cutter when making the joints; to provide for applying the rings to a mandrel or arbor of given diameter, preferably a few thousandths of an inch, such as three thousandths of an inch, smaller than the normal internal diameter of the rings; to provide for holding the rings upon such mandrel or arbor with the internal surfaces of the rings intimately in contact with the gaging surface of the mandrel or arbor whereby the internal diameters of the rings are exactly the same or in common, and the joints, previously cut, are closed; to provide for pressing or stressing the rings to the given internal or common diameter; to provide for holding, as by clamping, the rings in gaged position whereby they may retain or maintain their given or gaged internal diameters for the external machining, such as grinding, turning or finishing; to provide the rings with given or common external diameters while the internal diameters are maintained uniform or common or equal whereby the thicknesses of the rings will be equal in the corresponding points or portions thereof; to provide for machining, such as grinding, turning and finishing of the given exterior surfaces of the rings with all the joints in closed condition; to provide for novel means for carrying out such process or method; and, to provide for such other objects, advantages and capabilities as will later appear and are inherently possessed by the invention.

Figure 2:
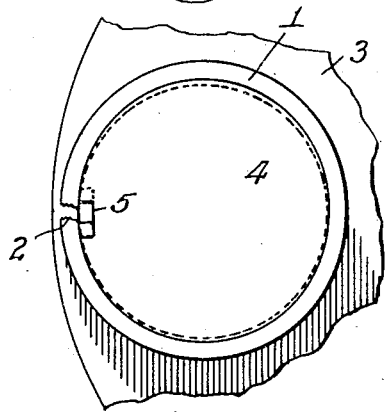
Figure 3:
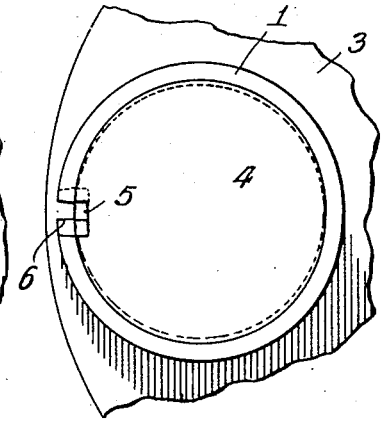
Figure 4:
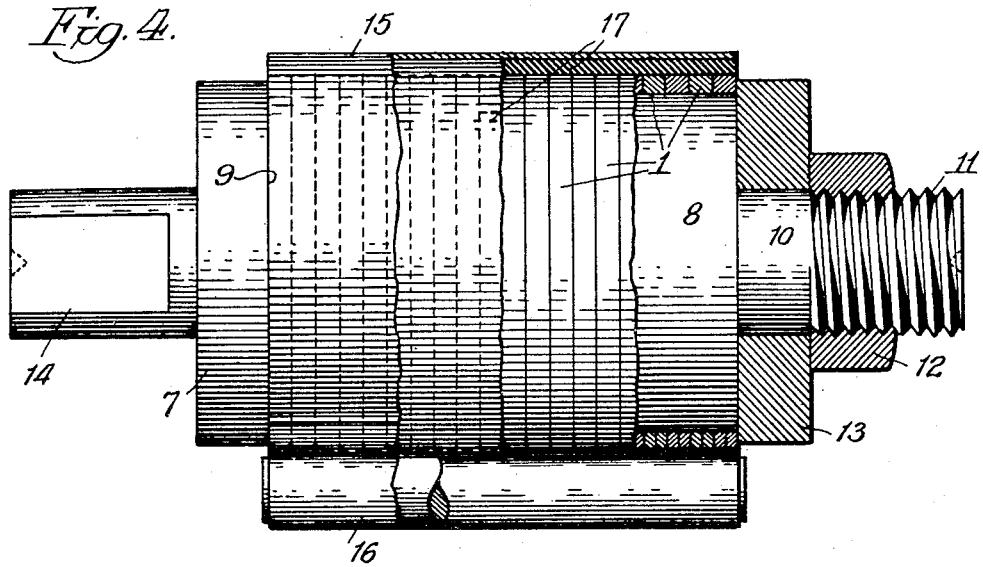
Figure 5:
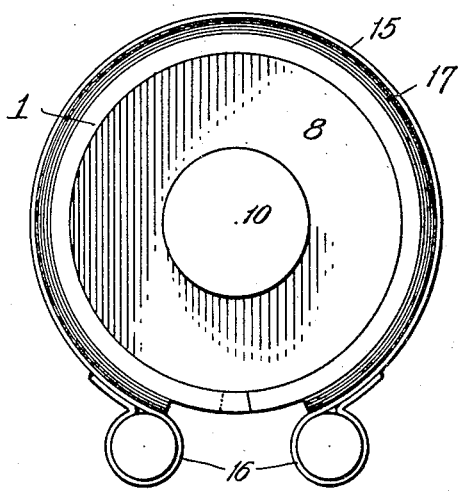

Referring to the drawings illustrating the method of carrying out the invention, Fig. 1 is a top plan view of a ring after having been broken at a given point thereof; Fig. 2 is a top plan view of the same and a fragmentary part of a template with the ring thereon and in expanded condition; Fig. 3 is a similar view with a joint or slot cut in the ends of the ring; Fig. 4 is a side view of a mandrel or arbor, part being shown in fragment and section, together with a plurality of rings on the mandrel and a clamping means for the rings; Fig. 5 is an end view of the mandrel with the rings and the clamping means; Fig.

Figure 10:
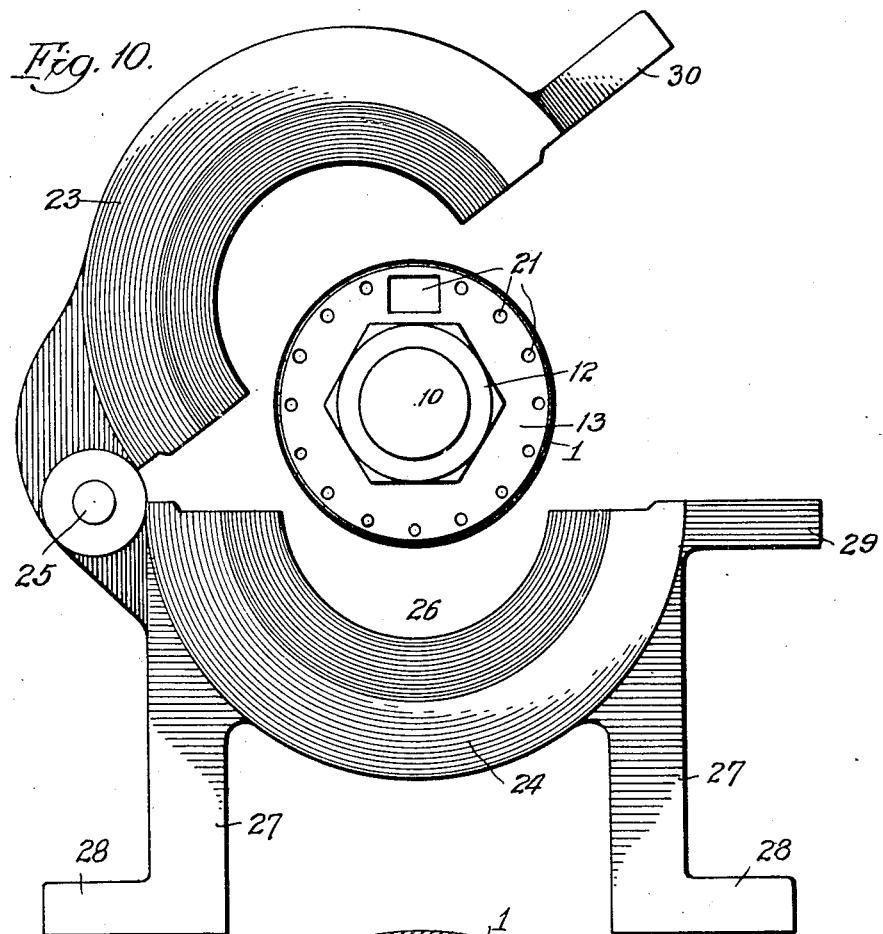
Figure 11:
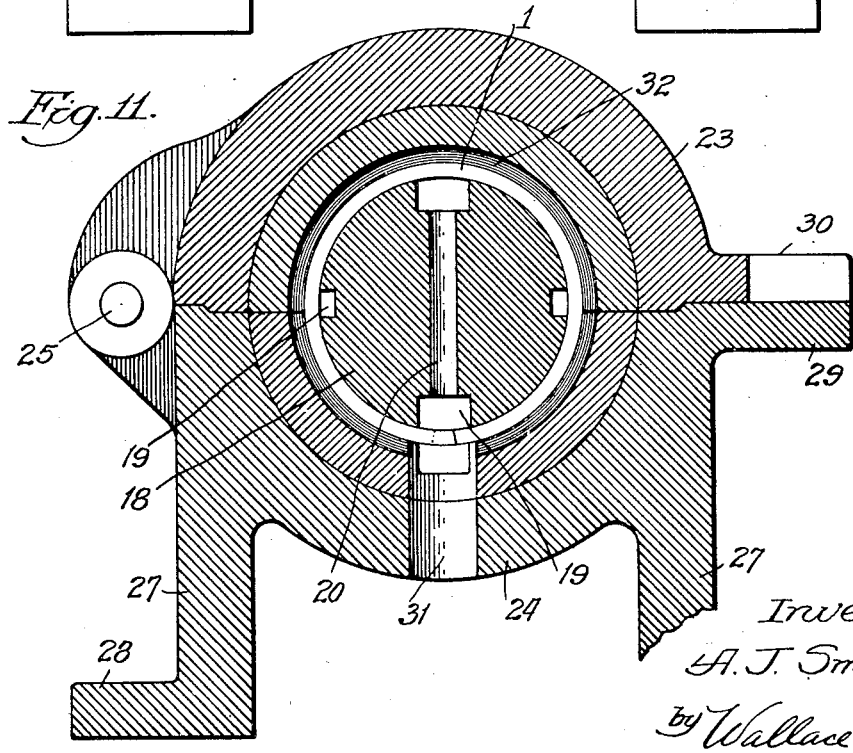

6 is a side view of another form of mandrel showing the parts in the process of assembly; Fig. 7 is an end view of the same; Fig. 8 is a longitudinal sectional view of the mandrel and the rings thereon and a pneumatic clamp whereby pneumatic pressure may be applied to the rings; Fig. 9 is a top plan view of the lower section of the pneumatic clamp; Fig. 10 is an end view of this clamp, partly opened, and a mandrel, with rings thereon, in position to be assembled in the clamp or when being removed from the clamp; and, Fig. 11 is a transverse sectional view of the clamp with the mandrel and rings therein.

Referring now more particularly to the drawings, the invention is generally practiced by first forming a ring, preferably by casting, in a continuous annular form or unbroken condition. This ring is cast in a molding machine with a given internal diameter, as near as can be practically obtained in molding, and when removed from the mold the surfaces of the ring are suitably sanded or sand blasted to remove the adhering foreign substances and to reduce whatever roughness these surfaces may have.

When molding the ring the sand or mold is provided with suitable means for providing an indentation or mark at a given point of the ring where the ring is to be later broken or severed. After being removed from the mold and suitably cleaned the ring 1 is then severed at the indented or marked point so as to provide a break 2 at the given point. In this way uniformity of the point where the breaks, and eventually the joints, occur is obtained. The severed ring is then placed upon a template having a base 3 upon which may be provided a number of template members 4 of such a size or diameter as to cause the ring 1 to be extended when placed upon the member 4. Preferably the member 4 is slightly oval in shape and a trifle larger in diameter than the normal internal diameter of the ring 1. This is clearly shown in exaggeration by the dotted line in Fig. 2 of the drawings. The member 4 is also provided with a channel or recess 5 in a side thereof and at the point where the break 2 of the ring is to be located, the channel or recess 5 serving to clear the teeth or cutting edges of a cutter for forming the joint or slot 6 of the ring at the break 2 thereof. Whether or not the rings vary in thickness, it will be apparent by placing the rings upon a template of given diameter, the internal diameter of the rings will then be the same or constant. The joint or slot 6 is then made with a cutter for removing material from the ends of the break 2. By using a cutter so that the slots of all the rings will be of equal or the same widths a ring of given internal diameter will be obtained when the ends of the joints are together or closed. This is irrespective of the amount of material on the exterior of the rings.

The rings are then taken and placed in a plurality upon a mandrel 7 of given and uniform outside diameter. Such a mandrel is shown in Fig. 4 and comprises the gaging body portion 8, a shoulder portion 9 against which an end of the series of rings 1 contacts, and, at the other end thereof with a shank 10, formed with threads 11 upon which is threaded a clamping nut 12 bearing against a clamping plate 13 adapted to press against the other end of the series of rings. The mandrel may be provided with a properly shaped tail piece 14 for operative connection with a suitable machine, such as a grinding machine, or turning lathe when machining the exterior surfaces of the rings. The rings are packed in series upon the gaging portion 8 of the mandrel and then the clamping plate and the nut 12 tightened to a given extent but not with a final clamping or tightening compression. About the rings is placed a surrounding clamp 15 preferably formed of resilient sheet metal and having end pieces or projections 16 capable of being included between the jaws of a vise or similar clamping device whereby the clamping sleeve 15 may be drawn tightly by the jaws of the vise. Between the exterior surfaces of the rings and the resilient clamping member 15 is preferably included a liner or packing 17 of resilient material, such as rubber, whereby the same may act upon the rings individually so that if any rings are thinner than others the rubber will project against the thinner ring and more the same toward the gaging portion 8 of the mandrel. As the clamping means is caused to press aganst the exterior of the rings, the same will act, together with the rubber liners 17, to press all of the rings intimately against the outer surface of the gaging portion 8 of the mandrel whereby the internal diameters of all the rings will be the same or common. When in this condition, the clamping plate 13 and the thumb nut 12 is then tightened so that the rings will be clamped tightly together in an axial direction and maintained thus without danger of any of the rings expanding from the common diameter thereof or form the gaging surface of the member 8. It will be apparent that before the clamping nut 12 is finally tightened, each individual ring was capable of movement under the pressing or stressing force of the clamping member 15.

These rings are now in condition to be machined on the exterior surfaces thereof. The clamping member 15 is removed and the mandrel with the rings clamped thereon, is then placed in a suitable machining device, such as a grinder, or a turning lathe or similar device for machining, grinding, turning or otherwise finishing the exterior surfaces of the rings to a given and uniform diameter. Inasmuch as the internal diameters of the rings are the same or equal and the external diameters are made equal or uniform, it will be apparent that the rings will all be of substantially the same thicknesses throughout the corresponding portions thereof and thus eliminate all possibility of the "thick and thin" variations sought to be avoided by this invention. It will also be noted that when the rings are clamped upon the mandrel body portion 8, the slots or joints are in just closed condition so that when the rings are with their joints closed the diameters of all the rings will be the same or common.

While Figs. 4 and 5 show one form of clamping means for clamping the rings to the mandrel 8, the invention comprehends other forms, an example of which is shown in Figs. 6 to 11 inclusive upon the drawings, the latter type of clamping device being designed for use of pneumatic pressure for pressing or stressing the rings to the mandrel. The mandrel in this case comprises a gaging portion 18 upon which the rings 1 may be assembled in a series and initially held in position by a clamping plate 13 and a clamping nut 12 threaded to the threaded portion 11 of the mandrel, the other end of the series of the rings bearing against the shoulder 9, as in the previous form of mandrel. This mandrel body 18 has one or more longitudinal channels 19 with which communicates one or more transverse passages or ducts 20 and also exhaust ports 21 and 22 provided in the clamping plate 13 and communicating with the ends of the channels 19. The shoulder portion 9 may also be provided with similar ports or passages 22 also communicating with the other ends of the channels 19. The channels and the cross-ducts, as well as the ports, normally communicate with the atmosphere so that the interior of the rings assembled upon the mandrel may be at normally atmospheric pressure when fluid or air pressure is applied to the exterior of the rings. This mandrel with the rings so assembled, is then located in a suitable pneumatic or fluid clamping device which comprises, preferably, a pair of hinged sections 23 and 24 pivotally connected by pivot means 25 and chambered to receive the mandrel with the rings. The chamber 26 thereof surrounds a series of rings which fit within the chamber with sufficient tightness to prevent the excessive escape of fluid from the chamber. The lower section 24 is supported upon suitable supporting legs 27 having feet 28 and has lateral projections 29 which cooperate with projections 30 upon the upper section whereby the two sections may be clamped tightly together by any suitable means as by clamping bolts and nuts or the like. The lower section is also provided with a fluid inlet passage 31 to which may be suitably connected any conductor of fluid under pressure. The chamber portion of the sections 23 and 24 may be provided with a number of grooves 32 and tongues 33 so disposed that the tongues may be located near to and opposite the rings, yet spaced from them, and the grooves provide passages or channels for the circulation of the compressed fluids about the exterior of the ring series.

When the fluid pressure is introduced into the chamber and around the series of the rings, the pressure will compress or press the rings to the gaging surface of the mandrel portion 18 and hold the rings to a common diameter equal to the outside diameter of the gaging portion 18. Any fluid leaking past the rings to the interior thereof will escape into the channels 19 and to the atmosphere through the ports 21 and 22. With the rings thus held in intimate contact with the mandrel, the clamping nut 12 may then be tightened so as to longitudinally or axially clamp the rings together tightly whereby not any of the rings may expand when the clamping device is opened and the mandrel with the rings removed therefrom.

The clamping device may then be opened and the mandrel, together with the rings clamped thereon, can then be removed to the machining device, such as a grinder, a turning lathe or like and similar apparatus whereby the exterior surface of the rings may be machined to the desired and given diameter.

From the above it will be apparent that when a thick ring is placed upon the template the separation of the broken ends will be greater than in the case of a thin ring, but inasmuch as both kinds of rings have the same internal diameter when on the template and the joint slots are cut equal, then when the ring contracts so that the joint ends are together or in closed condition, the rings will have the same internal diameters. This is irrespective of whether the rings have different outside diameters. The rings are then placed upon the mandrel so that their internal diameters will be the same or common and when clamped to be held in such condition the external diameters of the rings may then be formed or machined to be equal or common and therefore the thicknesses of the rings will be the same or equal. At the same time, as the result of cutting all the joint slots equal, the jointing of the ends of the rings will always be the same.

While I have herein described and upon the drawings disclosed methods and means for carrying out the invention, it is to be understood that the invention is not limited to the particular steps, constructions, details, or arrangements of parts so disclosed, but it also comprehends other steps, constructions, details, and arrangements of parts without departing from the spirit thereof.

Having thus described my invention, I claim:

1. In the process of making piston rings, the steps of forming each ring in a continuous form, of breaking each ring at a predetermined corresponding point thereof, of spreading each ring to a common internal diameter, and of holding each ring at said diameter while removing from each side of the break sufficient material to produce a gap of uniform width in all of said rings, the cut ring end then being adapted for closing to form a pressure retaining joint.

2. In the process of making piston rings, the steps of forming each ring in a continuous form, of breaking each ring at a predetermined corresponding point thereof, of spreading each ring to a common internal diameter, and of holding each ring at said diameter while removing from each side of the break sufficient material to produce on all the rings interior annular surfaces of uniform length, the cut ring ends then being adapted for closing to form a pressure retaining joint.

3. In the process of making piston rings, the steps of forming said rings in a continuous form, of breaking the rings at the predetermined points common to said rings, of spreading the rings by placing them on a substantially cylindrical member having unequal diameters, of enlarging the gaps in the rings by cutting material from each open end while the rings are in expanded position to provide corresponding pressure retaining joints in said rings having uniform internal annular surfaces.

4. In the process of making piston rings, the steps of forming said rings in continuous form, of breaking the rings at given points thereof, of placing the rings upon a template to increase the internal diameter of the rings to a given diameter, of cutting material from the rings from both sides of the break while the ring is in the expanded position to form joints of given width to produce a plurality of rings having equal interior annular surfaces and having similar pressure retaining joints.

5. In the process of making piston rings, the steps of forming the ring in continuous form, of breaking the ring at a given point thereof, of spreading the ring to a given internal diameter, of forming a joint of given width at the break in the ring while the ring is held expanded, of contracting the ring on a mandrel of given external diameter, of finishing the ring with a given external diameter while it is so held contracted, and of making other rings in like manner to thereby produce a plurality of rings having equal interior and exterior annular surfaces and having similar pressure retaining joints similarly positioned with reference to a common given point.

6. In the process of making piston rings, the steps of forming a plurality of rings of substantially equal internal diameters, breaking the rings at given and corresponding points, spreading the rings to a given or common internal diameter, forming joints of equal widths at the points of break while the rings are thus expanded, and thereafter removing material from the exterior surfaces of the rings to reduce them to a given external diameter whereby the rings will be of equal thicknesses.

7. In the process of making piston rings, the steps of forming a plurality of rings of substantially equal internal diameters, breaking the rings at given and corresponding points, spreading the rings to a given and common internal diameter, forming joints of equal widths at the points of break while holding the rings thus expanded, contracting the rings to a common diameter on a mandrel and with the joints in substantially closed condition, and machining the exterior of the rings to a common diameter whereby the rings are of uniform thicknesses.

8. In the process of making piston rings, the steps of forming a plurality of rings of substantially equal internal diameters, breaking the rings at given and corresponding points, spreading the rings to a given and common internal diameter, forming joints of equal widths at the points of break while holding the rings thus expanded, placing the rings upon a mandrel, stressing the rings to a common internal diameter with their entire interior surfaces firmly contacting with the exterior surface of the mandrel and reducing the exterior of the rings to a common diameter.

9. In the process of making piston rings, the steps of forming a plurality of rings of substantially equal internal diameters, breaking the rings at given and corresponding points, spreading the rings to a given and common internal diameter, forming joints of equal widths at the points of break while holding the rings thus expanded, placing the rings upon a mandrel, stressing the rings to a common internal diameter by pressing them into tight contact with the mandrel, securing the rings together for maintaining said internal diameter, and reducing the exterior of the rings to a common diameter.

10. In the process of making piston rings, the steps of contracting tightly upon a non-resilient cylindrical mandrel a plurality of split rings having interior annular surfaces of equal length, and of reducing the exterior surfaces of the rings to a given common diameter.

11. In the process of making piston rings, the steps of producing split rings having interior annular surfaces of equal lengths, of contracting a plurality of said rings upon a non-resilient cylindrical mandrel, of securing the rings together to maintain the contracted position on the mandrel, and of reducing the exterior surface of the rings to a given common diameter.

12. In the process of making piston rings, the steps of producing split rings having interior annular surfaces of equal length, of contracting a plurality of said rings tightly upon a substantially non-resilient cylindrical mandrel, and of reducing the exterior surfaces of the rings to produce a plurality of rings exactly alike.

13. In the process of making piston rings, the steps of producing split rings having interior annular surfaces of equal length, of contracting a plurality of said rings tightly upon a substantially non-resilient mandrel, and of reducing the exterior surfaces of the rings to produce a plurality of rings exactly alike and having their exterior surfaces parallel at all points to their corresponding adjacent interior surfaces.

14. In the process of making piston rings, the steps of producing split rings having interior annular surfaces of equal length, of placing the rings upon a mandrel of a given diameter, placing a resilient clamp about the rings whereby the internal surfaces of the rings will conform to the periphery of the mandrel, clamping the rings axially for holding them in the conformed condition, and removing the resilient clamp whereby the exterior of the rings may be machined.

15. In the process of making piston rings, the steps of placing rings upon a mandrel of a given diameter, placing the mandrel and rings thereon into a clamp having inlet and outlet ports, supplying fluid pressure into the clamp and exteriorly of the rings for stressing each ring to cause the same to conform its internal circumference to the circumference of the mandrel, then securing the rings together to maintain them in conformed condition, and removing the mandrel and rings whereby the rings may be machined.

In witness whereof, I hereunto subscribe my name to this specification.

ALBA JOHN SMITH.